United States Patent [19]
Glickman

[11] Patent Number: 5,267,167
[45] Date of Patent: Nov. 30, 1993

[54] METHOD AND SYSTEM FOR FORMATIONFINDING AND FORMATIONKEEPING IN A CONSTELLATION OF SATELLITES

[75] Inventor: Ronald E. Glickman, Boulder, Colo.

[73] Assignee: Ball Corporation, Muncie, Ind.

[21] Appl. No.: 698,606

[22] Filed: May 10, 1991

[51] Int. Cl.$^5$ ............................................. B64G 1/10
[52] U.S. Cl. .................................. 364/459; 364/460; 244/164; 244/176
[58] Field of Search ............... 364/434, 443, 449, 459, 364/460–462; 244/158 R, 161, 164, 171, 176; 342/352, 357; 455/12.1, 13.2, 98

[56] References Cited

U.S. PATENT DOCUMENTS

| | | | |
|---|---|---|---|
| 3,866,025 | 2/1975 | Cavanagh | 364/434 |
| 4,174,819 | 11/1979 | Brüderle et al. | 364/434 |
| 4,370,769 | 8/1989 | Draim | 244/158 R |
| 4,752,884 | 6/1988 | Slafer et al. | 364/434 |
| 4,758,957 | 7/1988 | Hubert et al. | 364/434 |
| 4,759,517 | 7/1988 | Clark | 244/168 |
| 4,898,349 | 2/1990 | Miller | 244/161 |
| 5,043,903 | 8/1991 | Constant | 364/460 |
| 5,109,345 | 4/1992 | Dabney et al. | 364/459 |
| 5,120,007 | 6/1992 | Pocha et al. | 244/158 R |
| 5,124,925 | 6/1992 | Gamble et al. | 364/459 |
| 5,160,935 | 11/1992 | Inamiya | 342/357 |

OTHER PUBLICATIONS

Leonard, Hollister and Bergmann, "Orbital Formationkeeping with Differential Drag", AIAA Journal of Guidance and Control (Jan.-Feb. 1989), vol. 12, No. 1, pp. 108-113.

Mathews et al., "Efficient Spacecraft Formationkeeping with Consideration of Ballistic Control", AIAA AA-88-0375, Jan. 1988.

Redding et al., "Linear-Quadratic Stationkeeping for the STS Orbiter", Journal of Guidance and Control (Mar.-Apr. 1989), vol. 12, No. 2, pp. 248-255.

Vassar et al., "Formationkeeping for a Pair of Satellites in a Circular Orbit", AIAA Journal of Guidance and Control (Mar.-Apr. 1985), vol. 8, No. 2, pp. 235-242.

Primary Examiner—Thomas G. Black
Assistant Examiner—Thomas S. Auchterlonie
Attorney, Agent, or Firm—Gilbert E. Alberding

[57] ABSTRACT

A method and system for formationfinding and formationkeeping in a constellation of satellites (20) orbiting about a primary body (34) is provided. A set of satellite (20) destination position (22) and time goals is selected corresponding to the satellite's (20) station in a desired constellation. The satellite (20) senses actual destination arrival positions (32) and times relative to reference positions independent of the constellation and compares these values to values from the set of goals. Corrective maneuvers are selectively implemented responsive to this comparison.

39 Claims, 4 Drawing Sheets

FIG.1

PORTION OF SATELLITE CONSTELLATION

FIG.2

INDIVIDUAL SATELLITE OF CONSTELLATION
AT EQUATORIAL CROSSING

METHOD AND SYSTEM FOR FORMATIONFINDING AND FORMATIONKEEPING IN A CONSTELLATION OF SATELLITES

TECHNICAL FIELD OF THE INVENTION

This invention relates in general to satellite formationkeeping, and in particular to a method and system for formationfinding and formationkeeping in a globally distributed satellite constellation.

BACKGROUND OF THE INVENTION

Increasingly, space systems and proposed space systems require satellite constellations, i.e., arrays of at least two satellites, to achieve system objectives. Constellations are necessary to provide the desired global coverage for many communication, remote sensing and scientific applications. Some systems in development will utilize hundreds and even thousands of satellites to achieve the desired coverage. Typically, the individual satellites in these constellations will employ inclined near-circular orbits to enhance coverage of areas distant from the equatorial plane. In addition, some proposed systems may employ relatively low altitude orbits, for example, in the case of cellular communications systems, to facilitate signal transmittal.

To ensure that the constellation provides the desired global coverage, the satellites must maintain their assigned stations in the constellation. It is desirable, particularly in constellations of large numbers of satellites, that this "formationkeeping" be achieved autonomously thereby simplifying system control. For example, autonomous formationkeeping could be achieved if each satellite was capable of sensing deviations from its assigned station and automatically implemented corrective maneuvers.

Internal direct approaches to autonomous constellation formationkeeping that have been suggested involve monitoring intersatellite spacing, differential orbital elements, or a combination thereof. According to such internal approaches, satellites would exchange position, rate of position, element set information, or a combination thereof on a continuous basis. Each satellite would then employ an algorithm, based on intersatellite spacing or element information, to determine differential station or element errors and implement corrective maneuvers as required to restore the desired spacing. In large systems, the constellation could be divided into rings, each comprising a number of satellites in substantially coplanar orbits, with each satellite determining its position relative to a ring leader satellite which would in turn key off leader satellites in adjacent rings. Thus, if a fixed geometry constellation was desired, formationkeeping according to the internal approach would cause the satellites in each ring to attempt convergence to neighboring satellite values of inclination, ascending node, argument of perigee, semi-major axis, and eccentricity. In addition, formationkeeping in such a system would require maintenance of constant interring spacing as well as constant distances and bearing angles with respect to satellites in adjacent rings.

There are a number of problems associated with an internal approach, particularly when high inclination and low altitude orbits are employed. First, orbital perturbation makes it difficult to identify station errors from systematic intersatellite spacing variation. Direct algorithms, which rely in part on differential element sets, must deal with poorly defined parameters of eccentricity and argument of perigee. At the least, both parameters will fluctuate rapidly due to both deliberate thrusting and the effects of orbital perturbations. The effects of minute thrusts on orbital elements can not be measured immediately but are revealed only through displacements observed a sizeable fraction of an orbit revolution later. The perturbative forces exerted on each satellite in the constellation include the following. The high order geopotential distortion due to Earth oblateness induces a bulk rotation, or precession of all orbit nodes with respect to inertial space. Lower order variations of the geopotential vary with location so as to induce undulating variations in altitude, intrack, and out of track positions about a single orbit. In addition, each satellite will be subjected to a variable component of drag. Drag accelerations vary due to factors such as satellite altitude variations due to the oblateness of the Earth add its atmosphere, localized variation in exospheric temperature associated with solar intensity, day to night and seasonal variations in atmospheric thickness, hourly and geographical variations due to change in geomagnetic index, and satellite to satellite variation in satellite profile and mass. Other perturbing forces important for higher altitude constellations include the gravitational pull of third bodies, such as the moon and sun, and forces induced by solar radiation pressure. Further variations in intersatellite spacing would result from orbital eccentricity residuals. Due to the spatial and temporal variability of these perturbing forces and effects, each satellite will experience a unique perturbation history and trace a unique orbital path. Consequently, identifying station errors from variations in intersatellite spacing would be extremely difficult.

Another problem associated with the internal approach to formationkeeping is the difficulty of calculating appropriate corrective maneuvers. After identifying station errors from systematic variations in intersatellite spacing, it would be necessary to implement a corrective maneuver to restore the desired spacing relative to satellites which may themselves be maneuvering. However, algorithms to implement the corrective maneuvers would need to address such things as complex drift patterns and circuitous trajectories (a approximately described by the Clohessy-Wiltshire equations) associated with maneuvering relative to rotating coordinate frames. The algorithms would have to allow for perturbative variations along the transfer trajectory plus the maneuver plans and projected perturbations of adjacent satellites. The identification of suitable combinations of thrust, thrust directions, plus start and stop times will present an extremely formidable challenge to designers using the direct method. Much fuel could be wasted on unnecessary backtracking due to the extreme complexity and required timing and precision of maneuvers. Thus, implementing corrective maneuvers would involve intensive processing.

Yet another problem associated with the internal approach to formationkeeping is the potential for error accumulation when station errors are determined relative to variable internal constellation geometry. If a first satellite engages in corrective maneuvering responsive to intersatellite spacing variation relative to a second satellite which itself is out of station, formationkeeping problems could be compounded to the extent of a chain reaction disruption of the entire constellation. Thus, unless a system was devised to correct formationkeeping errors relative to coordinates independent of constellation geometry, relative position errors could accumulate resulting, for example, in a build-up of constellation eccentricity plus secular changes in altitude and inclination.

SUMMARY OF THE INVENTION

Accordingly, objects of the present invention include the following:

The provision of a formationkeeping method and system which focuses on the individual satellite goals of reaching specified destinations at specified times, regardless of the details of the interim paths taken by the satellite thereby avoiding any need to directly control various orbital parameters.

The provision of a formationkeeping method and system wherein such goals may be determined through simple arithmetic progressions indicative of individual satellite station and common constellation values of altitude and inclination.

The provision of a formationkeeping method and system wherein station errors are determined relative to fiducial checkpoints which are absolute, i.e., independent of or external to the constellation, thereby simplifying formationkeeping and substantially precluding accumulation of errors.

The provision of a formationkeeping method and system which allows for repeated passes over selected points on the surface of a primary body by appropriate selection of such absolute fiducial checkpoints.

The provision of a method and system for autonomous formationkeeping thereby simplifying system control.

The provision of a formationkeeping method and system with reduced sensitivity to orbital perturbation.

The provision of a formationkeeping method and system wherein satellites can maintain their stations without the need to be aware of or exchange information with other satellites in the constellation.

The provision of a constellation wherein all satellites are maintained in a relatively narrow band of altitude and inclination, and in a substantially fixed constellation geometry.

The provision of a maintenance technique based on a thrusting schedule wherein maneuver requirements are easy to determine, compute, and implement, together with a reduced sensitivity to execution error.

The provision of a formationkeeping method and system which reduces the fuel requirements associated with formationkeeping.

The provision of a formationkeeping method and system wherein a simple near-term kinematic extrapolator (i.e., one devoid of force and mass dependency) could project future satellite position and compensate for position solution delay.

The provision of a formationfinding method and system wherein satellites automatically see their assigned stations thereby reducing the criticality of accurate initial satellite placement.

The provision of a simplified method and system by which average constellation altitude can be adjusted, for example, to respond to fluctuations in atmospheric thickness.

Although a distinction is sometimes made between the terms "formationkeeping" and "stationkeeping," the former referring to control of position relative to other satellites and the latter referring to control of position relative to an orbital station, no such distinction is intended herein. As will be apparent from the description below, formationkeeping and stationkeeping merge in the method of the present invention. Therefore, use of the term "formationkeeping" herein is not intended to exclude stationkeeping applications from the scope of the present invention.

In accordance with the present invention a system for formationfinding and formationkeeping in a constellation of satellites and a method for use in such a system is provided. The present invention allows satellites to find and maintain their assigned stations and spacings within a constellation without directly monitoring intersatellite spacing. Station errors are determined relative to reference positions independent of the constellation, i.e., positions other than the positions of other satellites in the constellation, thereby simplifying formationkeeping and substantially avoiding any accumulation of station errors. Satellites will gravitate to desired orbits which are similar in inclination, semi-major axis, eccentricity and perhaps argument of perigee, but instantaneous differential parameters need never be measured nor controlled directly.

The present invention provides a method and system for autonomous satellite formationfinding and formationkeeping in a constellation of satellites. A set of satellite destination position and time goals is selected corresponding to the satellite's station in a desired constellation. Actual satellite destination arrival positions and times are compared to values from the set of goals. The goals are set, and the actual arrival positions and times are determined, relative to checkpoints and/or reference systems independent of the constellation. An indication of station errors may be obtained based on position errors or rate errors (or a combination thereof) revealed through this comparison. Correction can be accomplished by maneuvering responsive to station errors indicated.

According to an embodiment of the present invention, a method for use in a formationfinding and formationkeeping system of a constellation of satellites orbiting about a primary body is provided. A set of satellite constellation destination position and time goals is selected corresponding to a satellite's station in a desired constellation. Actual destination arrival positions and times are sensed relative to reference positions independent of the constellation and compared to values from the set of goals. Corrective maneuvers can be selectively implemented, responsive to the comparison, so that arrival positions and times approach values from the set of goals.

According to another embodiment of the invention, a method for formationfinding and formationkeeping is provided. A rate of revolution of a satellite about a primary body and a rate of rotation of an orbital plane of the satellite are monitored. These rates may be monitored by sensing the satellite's positions, relative to reference positions or systems independent of the constellation, at a series of times. The rates sensed are compared to preselected values and a corrective maneuver can be selectively implemented responsive to the comparison to correct station errors.

According to another embodiment of the invention, a method for finding and maintaining a station in a substantially fixed geometry constellation of satellites in inclined, near-circular orbits is provided. A set of destination nodal longitudes and times is selected corresponding to each satellite's station in a desired constellation. Actual satellite nodal longitudes and times are sensed and compared to values from the set of goals. Responsive to this comparison, a thrust can be selectively provided to correct station errors indicated and to suppress any residual eccentricity.

According to yet another embodiment of the present invention, a satellite constellation formationfinding and formationkeeping system is provided. The system comprises a constellation of satellites, means for providing a signal indicative of satellite position at a time and a control means to correct station errors. The control means comprises a receiver to receive the signal, a thruster to apply an orbital correcting force, and a controller operatively associated with the thruster. The controller compares the satellite's actual position at a time, as indicated by the signal, to preselected values and can compute a corrective maneuver based on the comparison to correct formationkeeping errors.

It is an advantage of the present invention that a method and system for formationfinding and formationkeeping is provided which can be autonomous, thereby simplifying ground control. It is a further advantage of the present invention that constellation geometry is controlled indirectly thereby simplifying formationkeeping and substantially reducing any accumulation of station errors. It is a still further advantage of the present invention that corrective maneuver requirements are easily definable, determinable, and implementable, as compared to direct internal approaches.

DETAILED DESCRIPTION OF THE INVENTION

Throughout this description, elements will be described with respect to a specific reference frame, e.g., with respect to a primary body's rotating reference frame or inertial space. However, it is to be understood that these elements could be referenced to different frames without departing from the spirit and scope of the invention. For example, nodal regression rate with respect to Earth longitude could be expressed as nodal right ascension precession rate with respect to inertial space. Similarly, although orbital altitude and radius vary even for near-circular orbits, the two terms will occasionally be used together or interchangeably herein to generally refer to orbital size. Finally, some accepted approximate terminology is employed herein. For example, references Will be made to coplanar orbits or orbital planes. Although such expressions are merely approximations due to perturbation effects, such terms will be readily understood for purposes hereof by those skilled in the art.

Figure 1:
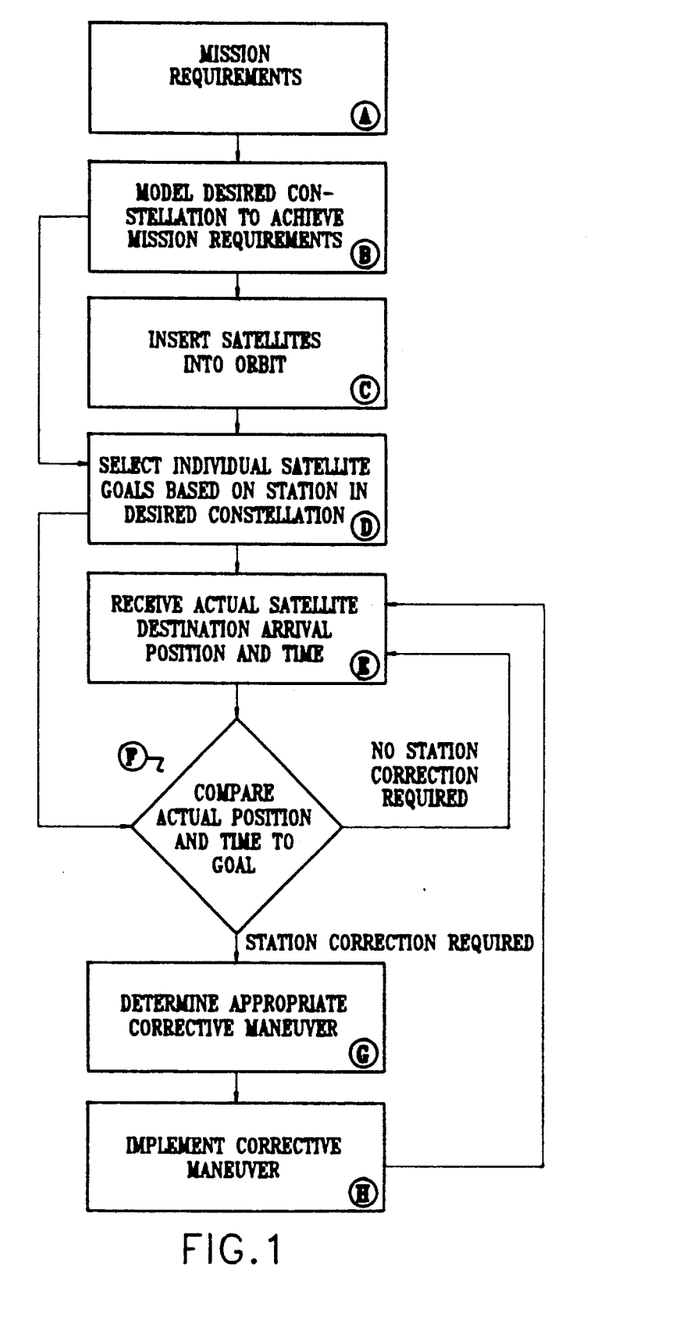
FIG. 1 is a flow chart of the method of an embodiment of the present invention.

Referring to FIG. 1, a flow chart of an embodiment of the method of the present invention is shown. An overview of the present invention will first be provided in connection with the flow chart. It is to be understood that the flow chart is exemplary and steps shown may be omitted or the sequence of steps may be changed without departing from the spirit and scope of the present invention. At block A, mission requirements for a space system are determined. For example, if an objective of the space system is to provide linkage for a cellular communications system, mission requirements may include such things as the selected geographic area of coverage, and the coverage density necessary to ensure that constellation satellites are continuously within a predetermined range of points within the selected geographic area of coverage.

At block B, a desired constellation is modeled to achieve system objectives. The desired constellation incorporates the number of satellites and average constellation inclination, altitude and other orbital parameters necessary to achieve system objectives. In the cellular communications example, it might be determined that a fixed geometry, low altitude and high inclination constellation of a large number of satellites is required to provide the desired global coverage. It is anticipated that near-circular, fixed geometry constellations will be preferred for many applications because such constellations may provide substantially uniform global coverage and substantially constant intersatellite spacing.

The satellites are inserted into orbits about a primary body, e.g., Earth, approximately corresponding to the satellites' stations in the desired constellation (Block C). This may be accomplished by coarse seeding the constellation, through use of drifting dispensers such as space shuttles or other delivery systems, and implementing appropriate initial maneuvers so that each satellite approximately attains its assigned station. The method of the present invention is then employed to allow each satellite to find and maintain its assigned station in the constellation.

According to the present invention, formationkeeping is accomplished by achieving the individual satellite goals of reaching preselected destinations at predetermined times, regardless of the higher order details of the interim orbital paths taken by each satellite. Thus, at block D, a set of destination position and time goals may be selected for each satellite based on the satellite's assigned station in the desired constellation. Actual satellite destination arrival positions and times are sensed relative to reference positions independent of the constellation (Block E) and compared values from the set of goals (Block F), as will be described below. If the comparison indicates a station error, an algorithm may be employed to determine the appropriate corrective maneuver (Block G). The satellite can then implement the corrective maneuver (Block H) and repeat the process at successive destinations. Of course, if the comparison indicates no station error, corrective maneuvers may be unnecessary.

Figure 2:
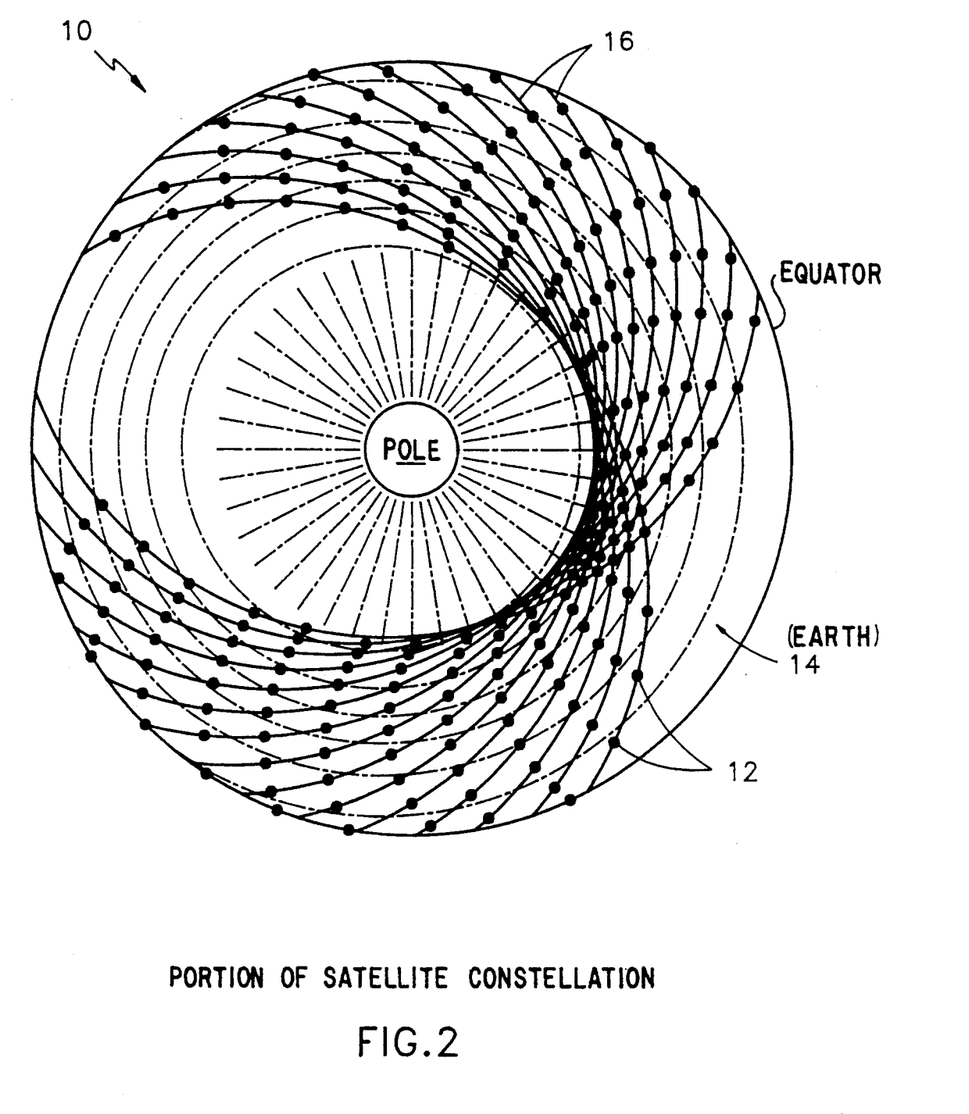
FIG. 2 is a polar elevational view of a particular satellite constellation in connection with which the present invention may be employed.

The invention will now be more fully described by reference to FIGS. 2 and 3. Referring to FIG. 2, a polar elevational view of a specific satellite constellation, generally identified by the reference numeral 10, in connection with which the present invention may be employed, is shown. The constellation comprises at least two satellites 12 orbiting about a primary body 14. Although the invention will be described with respect to Earth, it is to be understood that the primary body 14 could be the Moon or another body. As illustrated, the constellation 10 comprises a fixed geometric array of a large number of satellites 12 arranged in rings 16 of satellites 12 in substantially coplanar, inclined, near-circular orbits. Such near-circular constellations would be preferred for many applications. Near-circular orbits (and, more specifically, near-constant altitude orbits) can be used to provide low average surface-to-satellite distances while avoiding atmospheric re-entry. In addition, near-circular orbits facilitate constant intersatellite spacing and uniformity of global coverage. As is well-known, satellite velocity varies over the course of an elliptical orbit. Thus, maintenance of substantially constant intersatellite spacing requires near-circularity. For the sake of clarity, the constellation 10 is shown as covering only a portion of the primary body 14, but it is to be understood that the constellation 10 could be distributed so as to provide substantially uniform global coverage.

Figure 3:
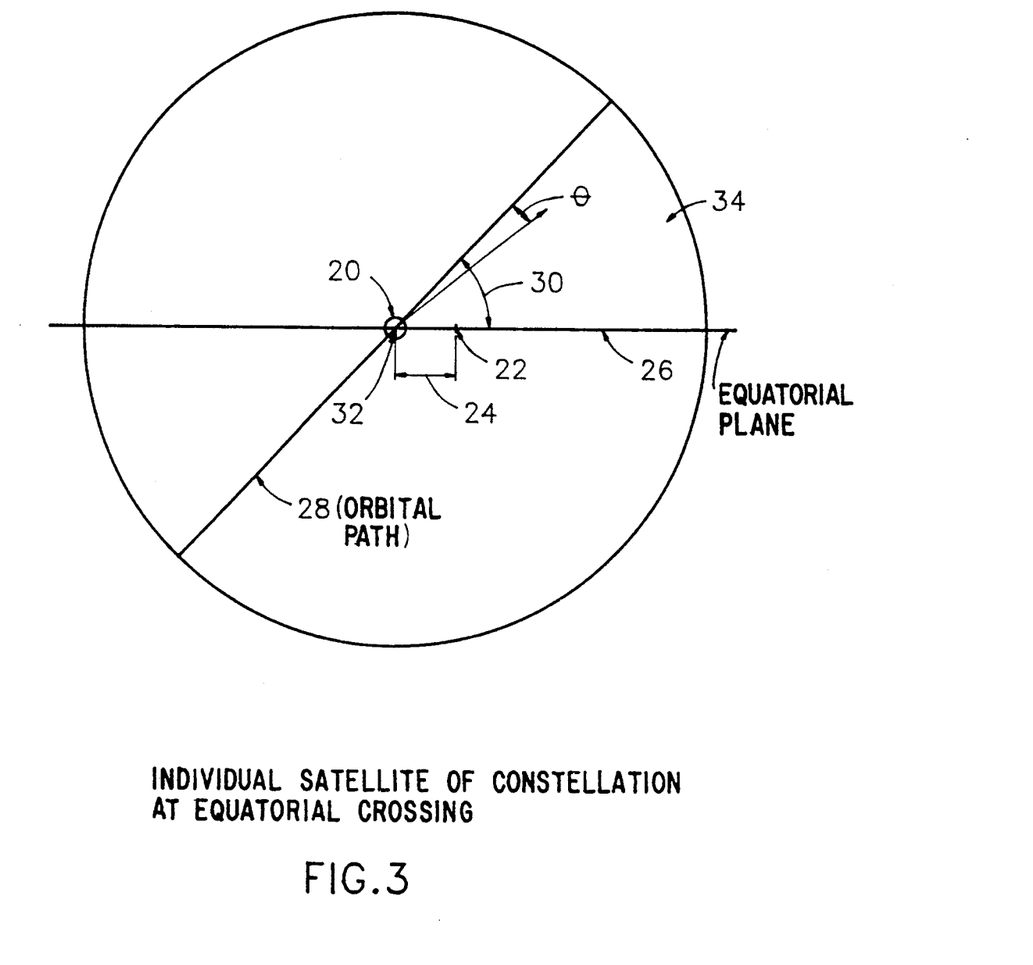
FIG. 3 is an equatorial elevational view of a satellite of a constellation in a reference frame which rotates with the satellite's orbital plane.

Referring to FIG. 3, the method of the present invention will now be described with respect to a single satellite 20 of a constellation. An equatorial elevational view of the satellite 20 of the constellation is shown in a reference frame rotating with the satellite's 20 orbital plane. According to the present invention, a method and system for formationfinding and formationkeeping is provided which through solely indirect means is capable of autonomous formationkeeping. The present invention thus substantially reduces or eliminates the complexities associated with directly dealing with perturbation effects. The invention also eliminates the need to directly measure or control such orbital parameters as eccentricity, inclination, argument of perigee and semi-major axis as well as all intersatellite measurements including distances, angles and rates.

A set of satellite destination position and destination time goals is selected for each satellite 20 corresponding to the satellite's 20 station in a desired constellation. The desired constellation may reflect such things as desired constellation altitude or radius, and desired rate of nodal regression for satellite 20 orbits. Based on the desired constellation, the set of position and time goals is selected for each satellite 20 corresponding to the satellite's 20 assigned station in the constellation. Thus, the process of selecting goal values may comprise receiving a set of constellation values and determining individual satellite goals based on the values received. The set of goals can thereby serve as fiducial checkpoints by which satellite station errors may be monitored.

As can be understood, meeting the destination position and time goals is closely related to knowledge of the satellite's orbital period and nodal regression rate (or to the rate of rotation of the orbital plane). For example, if the satellite 20 arrives at a destination goal position 22 after the destination time goal, that may indicate that the satellite's 20 period is too long and that the satellite's 20 semi-major axis is greater than desired. In the case of near-circular orbits, such an error may indicate a departure from desired values of orbital altitude or radius. Likewise, a position error 24, such as where the destination goal position 22 is located lateral to the actual destination arrival position 32, may indicate a departure from the desired value of nodal regression rate, e.g., the satellite's 20 orbital plane may be rotating faster than desired relative to the Earth. Thus, it will be understood that rates, such as rate of satellite revolution or period and rate of orbital plane rotation or nodal regression rate, could be calculated and used to indicate station errors according to the present invention.

Although the destination goals may be variously located, it is preferred that they be located near the equatorial plane 26 or at satellite orbital nodes. For example, the set of destination goals may comprise a dual series of desired ascending node locations and times. Such series could be simply derived, for example, through simple arithmetic progressions of the projected times and locations of successive desired ascending nodes, a process which can be carried out autonomously aboard each satellite (or remotely) indefinitely into the future. Such progressions could comprise initial terms, unique for each satellite, reflective of satellite station plus interval constants of time and positional shift based upon desired constellation values of altitude an inclination.

There are a number of reasons why destination goal positions 22 near the equatorial plane 26 are desirable. First, for inclined orbits, the satellite's 20 greatest rate of latitude change and least rate of longitude change per unit time will occur at or near the equatorial plane 26. Thus, for example, if station errors, including both position errors 24 and time errors, were determined as of the moment the satellite 20 reached the destination latitude, the true arrival time and longitude would be most accurately determinable for destinations at or near the equatorial plane 26. In addition, it may be desirable to implement corrective maneuvers near the equatorial plane 26. To enhance orbital circularity, it is desirable to thrust opposite the highest or lowest point in the orbit. For example, a positive thrust along and tangential to the orbital path 28 opposite the lowest point in the orbit could serve to raise the lowest point. Thus, thrusting near the equatorial plane 26 may be desirable, particularly in the case of low altitude orbits, because the lowest point in the orbit is likely to be near the equatorial plane 26 due to the Earth's oblateness.

Another reason why it may be desirable to maneuver near the equatorial plane 26 relates to fuel savings. Certain efficiencies can be achieved if the time and position errors are corrected in one maneuver near the equatorial plane 26, rather than through separately dedicated maneuvers at separate points in the orbit. Time errors may be corrected by providing a component of thrust tangential to the orbital path 28 thereby changing the orbital velocity and period. Position errors 24 may be corrected by providing a component of thrust normal to the orbital path 28 thereby providing a change in orbital inclination 30 and nodal regression rate (these components are not entirely separable, for example, lower order effects of normal thrusting may have a very small effect on time errors and vice-versa). It is anticipated that both components could be provided through a single thrusting maneuver directed a small angle, $\theta$, away from the orbital plane and orbital tangent. Such a maneuver could provide the position correcting component with relatively little loss to the time correcting component because the position correcting component will be generally proportional to $\sin \theta$ while the time correcting component will be generally proportional to $\cos \theta$. Thus, as $\theta$ changes from 0° to a small angle, the position correcting component will increase relatively rapidly and the time correcting component will decrease relatively slowly.

Furthermore, position errors are most efficiently corrected by maneuvers near the equatorial plane 26 or orbital nodes because, at such points, the smallest vectorial change in satellite 20 velocity may be utilized to change orbital inclination 30 thereby effecting a desired change in the rate of nodal regression. Thus, it is desirable to implement the combined thrusting maneuver near the equatorial plane 26. Finally, it is desirable, though not necessary, to implement such a corrective maneuver near the destination goal position 2 where the station errors were measured thereby checking errors at an early point in their formation to enhance accuracy. For all of the foregoing reasons, it is preferred that the destination goal positions 22 be located near the equatorial plane 26. However, it is to be understood that other destination goal positions 22 and maneuvering locations, or separately dedicated maneuvers may be employed.

According to the present invention, actual satellite destination arrival positions 32 and times are sensed relative to reference positions independent of the constellation. Although the invention will be described with respect to an embodiment wherein the satellite 20 senses arrival and employs an on board processor to compare arrival positions 32 and times to values from the set of goals, it is to be understood that the steps of sensing and comparing could be performed remotely. The satellite 20 may sense its position 32, for example, with respect to inertial space, e.g., by reference to distant celestial bodies, or the primary body 34. For example, if the selected destination goal position 22 was in the equatorial plane 26, the actual destination arrival position 32 of the satellite 20 could be described by reference to the longitude of an orbital path 28 of the satellite 20 at the moment of satellite 20 equatorial crossing. Similarly, for inclined orbits, the actual destination arrival position 32 of the satellite 20 may be described by the longitude of the satellite 20 at the moment a path of the satellite 20 crosses a destination latitude. However, it is to be understood that the actual time and position of destination arrival need not be referenced to destination goal latitude. Rather, arrival may be referenced to destination longitude, or another fiducial locus of points relative to the destination goal position 22, or other spatial relationship between the destination goal position 22 and the satellite 20.

Actual destination positions 32 and destination times may be sensed through any means capable of supplying such information i.e., any means capable of providing information indicative of satellite positions, relative to a reference position independent of the constellation, at corresponding times. The time and position information may be provided in the form of signals, e.g., radiation such as light or electromagnetic energy, from Earth-based transmitters, reference positions such as distant celestial bodies, or other positioning systems. By way of example, such information may be supplied by employing an on board NAVSTAR Global Positioning System (GPS/NAVSTAR) receiver. The GPS/NAVSTAR system comprises a constellation of satellites capable of accurately locating properly adapted receivers. Thus, according to the present invention, a satellite 20 could be equipped with a GPS/NAVSTAR receiver adapted to receive a GPS/NAVSTAR signal and provide time and position information relating to satellite destination arrival. For example, if a destination goal position 22 was located in the equatorial plane 26, the satellite 20 might employ a GPS/NAVSTAR receiver to provide the precise longitude and time of satellite equatorial crossing. Other systems, means or methods for providing similar information may be employed.

The actual destination positions 32 and times sensed are compared to values from the set of destination position 22 and time goals and corrective maneuvers can be selectively implemented responsive to the comparison. For example, a controller, such as an on board (or remote) computer, may compare the actual values to the goal values. The controller may employ a goal seeking algorithm to determine and implement a corrective maneuver to annihilate an indicated error by the next crossing or implement a schedule of maneuvers to reduce the error or drive it to zero over a series of crossings. As will be understood by those skilled in the art, determination and implementation of corrective maneuvering may make use of the following effects: drag or retro-tangential thrusting decreases orbital period and advances next destination arrival time; positive tangential thrusting increases orbital period and retards next destination arrival time; and positive or negative components of thrust normal to an orbital tangent and plane (preferably nearest the orbital nodes) changes inclination 30 thereby altering orbital plane rotation rate so that positions, e.g., longitudes, are advanced or retarded at subsequent destination arrivals. The algorithm may further include deadband and smoothing functions utilizing station error history and rate information feedback so that station errors are corrected smoothly and efficiently. Thus, a typical goal seeking algorithm could comprise a conventional feedback control system employing suitable gains and damping factors, plus simple partial derivatives expressive of the relationship or sensitivity between computed error magnitude and the velocity change or changes needed for reference goal convergence.

The position correcting and time correcting components of thrust may be supplied through a single maneuver as described above. This may be accomplished by thrusting, e.g., by burning fuel, accelerating ions, using radiation pressure, etc., to provide propulsion, in a direction to provide the desired components. To achieve the desired thrust direction, the satellite may be "crabbed" to the desired angle, for example, by using momentum wheels, thrusters, or other attitude control systems, prior to thrusting.

To enhance orbital circularity and provide constant intersatellite spacing, a thrust may be applied at a point opposite the highest or lowest point in the orbit. If orbits start to become elliptical, satellites speed up near their perigees and slow down near their apogees resulting in intersatellite divergence. Positive thrusting opposite an orbital low point or retro-thrusting opposite a high point will suppress eccentricity build-up and enhance constant spacing. It is a particular feature of the present invention that, like absolute orbit size and inclination, neither perigee argument nor eccentricity itself need ever be directly measured or determined to achieve continuous, automatic, and indirect suppression of the eccentricity. Rather, a coarse determination of either height or radius variations with respect to time, such as might be obtained through a simple continuous sorting algorithm by itself reveals the extremum locations needed for eccentricity to be controlled in this manner. The satellite could simply employ a nadir-directed altimeter to provide altitude information from which such high or low points may be determined. Furthermore, such thrusting points can be anticipated because they lie one-half nodal period beyond the previous point so determined. In this regard, certain efficiencies result from identifying high or low points on the basis of relative altitude rather than a relative radius. If altitude is used, then due to Earth oblateness the natural succession of orbital low point locations will tend to stabilize near the equatorial plane, as the orbit becomes increasingly more circular commensurate with each thrust component connected with destination. Thus, the time, position, and eccentricity correcting thrusts can be efficiently and conveniently combined into a single, fuel-efficient maneuver near the equatorial plane.

Figure 4:
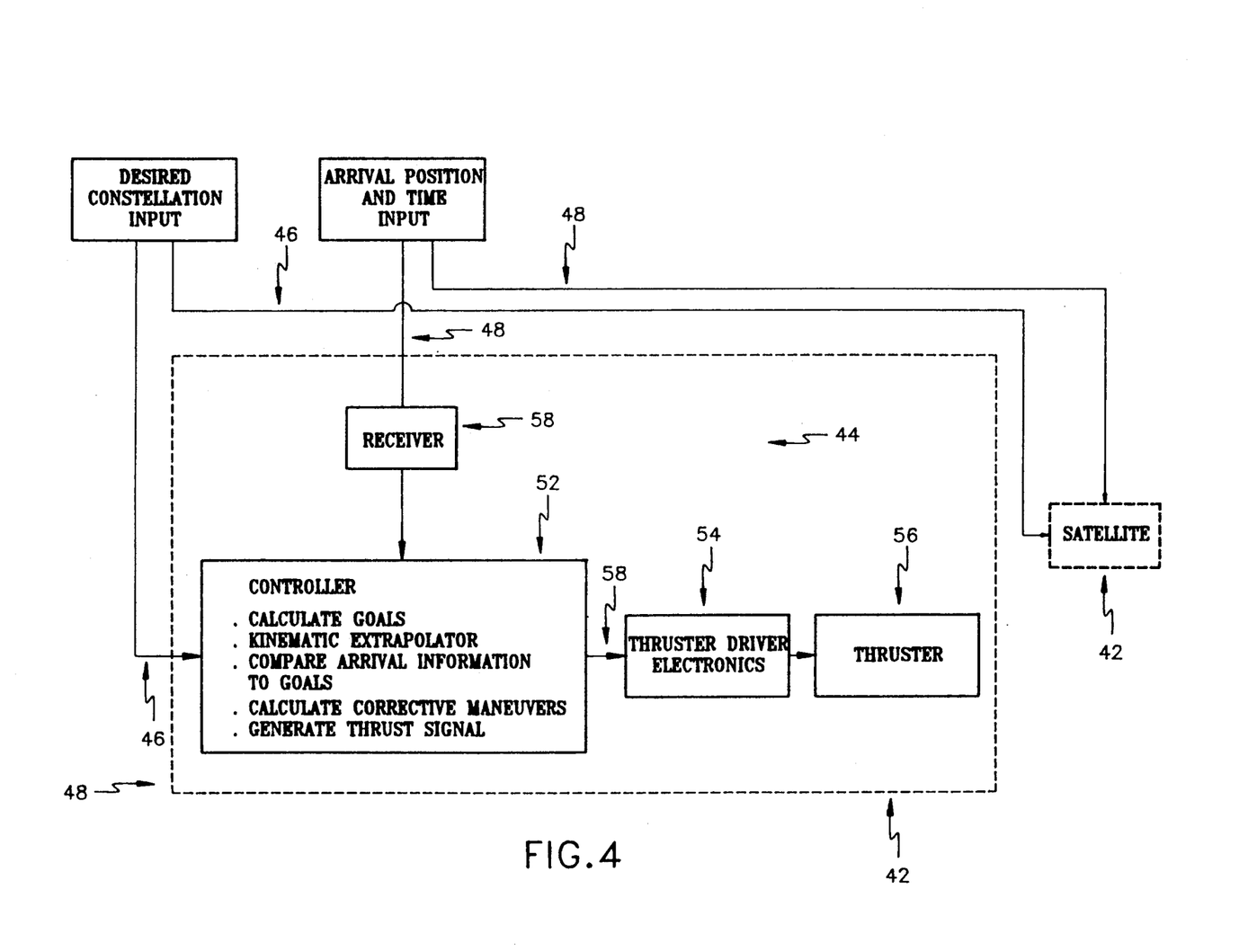
FIG. 4 is a schematic diagram of a constellation formationfinding and formationkeeping system in accordance with an embodiment of the present invention.

Referring to FIG. 4, a schematic diagram of a formationfinding and formationkeeping system in accordance with the present invention is generally identified by the reference numeral 40. The system 40 comprises a constellation of at least two satellites 42 and an orbital control system 44. Although the control system 44 is located on board each satellite in the illustrated embodiment, the control system may be located remotely and need not comprise a separate unit for each satellite. The control system 44 receives input, generally identified by the arrow 46, indicative of desired constellation parameters which, as described above, may include such things as common constellation values of altitude and inclination. The control system 44 also receives input, generally identified by the arrow 48, indicative of actual satellite destination arrival position and time. As described above, such information may be provided in the form of signals from Earth-based transmitters, reference positions or from other positioning systems such as the GPS/NAVSTAR system.

Although the control system of only one satellite is shown in detail in FIG. 4, it is to be understood that similar equipment may be employed on board each satellite in the constellation. The control system may comprise a receiver 50, a controller 52, thruster driver electronics 54 and a thruster 56. The receiver 50 receives the destination arrival position and time input 48 and comprises, for example, a light sensor or an antenna to receive signals from Earth-based transmitters or a GPS/NAVSTAR receiver. The controller 52, which may comprise a processor such as a computer, receives the desired constellation input 46 and may perform a number of functions including: computing a set of satellite destination arrival position and time goals based on the satellite's position in the desired constellation; comparing actual satellite arrival positions and times to values from the set of goals; calculating appropriate corrective maneuvers based on the comparison; functioning as a kinematic extrapolator to project future satellite position and compensate for position solution delay; and generating a thrust signal, e.g., an electric signal generally identified by the arrow 58, to initiate the appropriate corrective maneuver. The thrust signal 58 is received by the thruster drive electronics 54 and a corrective maneuver is implemented as is well known in the art. The thruster 56 may comprise, for example, a rocket engine, an ion accelerator, solar sails, an electromagnetic thruster or any other mechanism providing a propulsive force.

In addition an attitude control system (not shown) may be employed as part of the control system 44. As described above, certain efficiencies may be achieved if one maneuver is utilized to correct time, position, and eccentricity errors. This may be accomplished by directing a single thrust to provide the components necessary to simultaneously correct all of these errors. The thrust may be directed by using thrust deflectors or thruster gimbals, or by controlling spacecraft attitude using, for example, momentum wheels, magnetic torquers, control gyros, thrusters or other attitude control systems. Of course many other systems may be included on board the satellite and the components and configuration of the satellite may vary greatly depending, for example, on mission requirements. Other systems would typically include servicing systems such as thermal control, command, power supply and telemetry systems.

In practice, an embodiment of the present invention could operate as follows. A dispenser could unload a constellation satellite approximately at its assigned station. Based on information received from a ground computer indicative of required constellation period, nodal regression rate, ring spacing, intraring satellite spacing, and so forth, an on board computer could determine a set of destination time and position goals corresponding to its assigned satellite station. For example, the set may comprise a series of ascending (or descending) node or equatorial crossing times and longitudes. At an equatorial crossing or other destination arrival, as sensed by an on board GPS/NAVSTAR receiver, the actual destination arrival time and position may be compared to values from the selected set of goals. Responsive to this step of comparing, recursive maneuvers can be selectively implemented to systematically correct any timing, positioning, or eccentricity errors indicated. Each satellite thus seeks its assigned position in the constellation. By causing each satellite in the constellation to reach specified destinations at specified times, the entire constellation will be indirectly forced within narrow bands of altitude or radius, inclination, rate of nodal regression and other orbital parameters. Thus, intersatellite spacing will be controlled indirectly. It is anticipated that intersatellite spacings should vary by only about twenty kilometers according to the formationkeeping method of the present invention.

The present invention has a number of advantages in addition to those already mentioned. First, the invention provides a method and system of formationfinding wherein satellites can automatically seek their assigned stations thereby reducing the criticality of accurate initial satellite placement. According to the invention, misplaced satellites can autonomously seek their assigned stations by reference to positions independent of the constellation. By contrast, if station errors were determined internally, e.g., by variations in intersatellite spacing, accurate initial placement would be critical. Although this formationfinding process will generally operate like the formationkeeping process described above, separately dedicated maneuvers to correct position, time, and eccentricity errors may be required until substantial circularity is achieved. For example, upon initial placement, a satellite may have an apogee or perigee located away from the equatorial plane thereby rendering it desirable to provide a separately dedicated eccentricity correcting thrust away from the equatorial plane.

The present invention also provides a simplified method for formationfinding and formationkeeping in a near-circular constellation. This is accomplished by monitoring and controlling the three easily sensed parameters of nodal period (or arrival time), nodal regression rate (or arrival position), and orbital circularity (or the relative heights of the highest and lowest points in the orbit). Moreover, a single thrust may be utilized to correct all three of these parameters.

In addition, a near term satellite kinematic extrapolator (i.e., one devoid of force and mass dependency) may be employed in the method of the present invention, to compensate for position solution delay and for anticipation for maneuvers. The extrapolator could keep a continuously updated plot of latitude, longitude, altitude versus time, and so forth, projecting, for example, a minute or so into the future. Thus, a controller could make use of the extrapolator output to compensate for position solution delay of perhaps a few seconds in the case of a system such as GPS/NAVSTAR. In addition, extrapolator output could be utilized to identify the highest or lowest points in the satellite's orbit for thrust application to enhance orbital circularity. Moreover, in many applications it may be desirable that the satellites of the constellation, of different constellations or otherwise, be capable of communicating. Using the extrapolator to project future satellite location could facilitate such communication. Such a kinematic extrapolator would be significantly simpler than the force and mass dependent orbit propagators which might be required to maneuver in internal intersatellite spacing types of formationkeeping systems such as those described above. Finally, it is to be understood that the term "extrapolator" does not preclude supplemental use as an interpolator to provide other operational enhancements, e.g., to confirm the accuracy of values previously extrapolated or identify the satellite's position at a particular time in the past for data correlation, instrument calibration, or for calibration of the extrapolator itself.

The invention also provides a method and system whereby average constellation altitude or radius can be adjusted. For example, a ground computer could send a command indicating newly desired constellation altitude. The individual satellites could then compute new goals to reflect the newly desired constellation altitude. This would allow the entire constellation to be raised to a higher altitude, thereby saving fuel if, for example, a change in solar activity or a short term geomagnetic phenomenon seemed to be responsible for an increase in drag. Conversely, the constellation could be lowered to take advantage of atmospheric contractions. Finally, for some missions, including some remote sensing applications, it is desirable that satellites make periodic passes over the same location to collect comparative data. This requires a satellite orbit of specific period and altitude or radius. The present invention allows altitude adjustment for all of these reasons.

Another advantage of the present invention relates to its use of checkpoints which are independent of the constellation. This precludes the accumulation of relative position errors which could occur in systems wherein station errors were identified from variations in intersatellite spacing. In addition, the use of absolute checkpoints allows individual satellites to be redistributed, for example, to fill gaps, without disturbing other satellites in the constellation.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for finding and maintaining a satellite station in a fixed geometry constellation of at least two satellites in inclined, near-circular orbits about a primary body, comprising the steps of:
   a) selecting constellation values common to each satellite of said constellation indicative of each said satellite's orbital period, inclination, and nodal regression rate;
   b) determining a set of nodal arrival longitude and time goals for each satellite based on its station in said constellation;
   c) measuring actual satellite nodal arrival longitudinal and times for each said satellite;
   d) comparing said actual longitudes and times for each said satellite to values from the set of goals to identify station errors; and
   e) maneuvering each said satellite to correct differences between said actual longitudes and times and values from said set of goals.

2. The method of claim 1, comprising the steps of:
identifying a high or low altitude point in an orbit; and
thrusting substantially at said high or low point to enhance orbital circularity.

3. The method of claim 2, comprising the step of:
combining said step of thrusting with said step of maneuvering to simultaneously correct errors in longitude and time and enhance orbital circularity.

4. A method for use in a formationfinding and formationkeeping system of a constellation of at least two satellites orbiting about a primary body, comprising the steps of:
   a) establishing a reference datum external to said satellite constellation;
   b) selecting a set of satellite destination position and time goals for each satellite with respect to said external reference datum, the set of goals corresponding to each satellite's station in a desired constellation;
   c) measuring arrival positions and times of each said satellite with respect to said external reference datum; and
   d) comparing said arrival positions and times for each said satellite to values from said set of goals to identify deviations of each said satellite from each said satellite's station in said desired constellation.

5. The method of claim 4, wherein said step of measuring comprises determining the longitude and time at which a satellite passes through a destination latitude.

6. The method of claim 4, wherein said step of measuring comprises determining the longitude and time of an equatorial crossing of said satellite.

7. The method of claim 4, wherein said step of measuring comprises receiving a signal indicative of said satellite's position at a time.

8. The method of claim 4, wherein said step of measuring comprises receiving a GPS/NAVSTAR signal on board said satellite.

9. The method of claim 4, wherein said step of selecting comprises selecting constellation values common to each satellite of said constellation indicative of each satellite's altitude, inclination and nodal regression rate and determining said set of goals using said constellation values.

10. The method of claim 9, wherein said step of selecting comprises receiving a signal indicative of said constellation values, and determining said set of goals based on said common constellation values such that said set of goals changes responsive to changes in said constellation values.

11. The method of claim 4, further comprising the step of:
selectively implementing corrective maneuvers responsive to said step of comparing so that said arrival positions and times approach values from said set of goals.

12. The method of claim 11, wherein said step of implementing comprises thrusting tangentially to an orbital path of said satellite to correct a time error.

13. The method of claim 11, wherein said step of implementing comprises thrusting normally to an orbital path of said satellite to correct a position error.

14. The method of claim 11, wherein said step of implementing comprises thrusting normally to an orbital path of said satellite near an orbital node to correct a position error.

15. The method of claim 11, wherein said step of implementing comprises thrusting tangentially and normally to an orbital path of said satellite to correct time and position errors.

16. The method of claim 11, wherein said step of implementing comprises utilizing feedback from satellite orbital history to determine a corrective maneuver so that said actual destination positions and times smoothly approach values from said set of goals.

17. The method of claim 11, wherein said step of implementing comprises projecting a future satellite position for implementing a corrective maneuver so as to compensate for position solution delay.

18. The method of claim 11, wherein said step of implementing comprises projecting a future satellite position for implementing a corrective maneuver so as to provide anticipation for maneuvers.

19. The method of claim 11, wherein said step of implementing comprises the steps of:
   identifying the highest or lowest point in an orbit; and
   applying a thrust substantially at said highest or lowest point to enhance orbital circularity.

20. The method of claim 9, wherein said step of implementing comprises:
   applying a thrust at the point of highest or lowest altitude in an orbit to correct time, position and eccentricity errors.

21. A method for formationfinding and formationkeeping in a constellation of at least two satellites orbiting about a primary body, comprising the steps of:
   a) measuring the rate of revolution of each satellite of said constellation about said primary body;
   b) measuring the rate of rotation of the orbital plane of each said satellite of said constellation relative to said primary body;
   c) comparing said rates to preselected values to identify deviations of each said satellite from each said satellite's station in a desired constellation; and
   d) implementing corrective maneuvers responsive to said step of sensing so as to correct station errors indicated by said deviations of each said satellite from each said satellite's station in said desired constellation.

22. The method of claim 21, wherein said rate of revolution is monitored by sensing the times at which said satellite arrives at selected destinations.

23. The method of claim 21, wherein said rate of revolution is monitored by sensing the times at which said satellite crosses selected latitudes.

24. The method of claim 21, wherein said rate of revolution is monitored by sensing the times at which said satellite arrives at orbital nodes.

25. The method of claim 21, wherein said rate of rotation is monitored by sensing a rate of nodal regression.

26. The method of claim 21, wherein said rate of rotation is monitored by sensing positions of said satellite relative to checkpoints external to said constellation.

27. The method of claim 26, comprising the step of selecting said checkpoints based on said satellite's station in a desired constellation.

28. The method of claim 26, wherein said step of comparing comprises comparing said positions sensed to checkpoint positions.

29. The method of claim 21, wherein said steps of measuring comprise receiving signals indicative of satellite positions at corresponding times.

30. The method of claim 21, wherein said step of comparing comprises selecting a desired rate of revolution and a desired rate of rotation for said satellite by determining desired constellation parameters and computing the desired rates based on said satellite's station in said constellation.

31. The method of claim 21, wherein said step of implementing comprises determining an appropriate maneuver to correct differences between said rates and said preselected values.

32. The method of claim 21, wherein said step of implementing comprises thrusting so that said rates approach said preselected values.

33. The method of claim 21, wherein said step of implementing comprises directing a single thrust so as to correct both errors in rate of revolution and rate of rotation.

34. A satellite constellation formationfinding and formationkeeping system, comprising:
   a constellation of satellites orbiting about a primary body;
   means, external to said constellation, for providing signals to each satellite indicative of each said satellite's actual position at corresponding times; and
   control means comprising:
      receiver for receiving said signals;
      a thruster for applying a force to change each said satellite's orbit; and
      a controller operatively associated with said thruster to compare said actual positions to preselected positions external to said constellation and calculate corrective maneuvers based on said comparison.

35. The satellite system of claim 34, wherein said means for providing comprises an Earth-based transmitter.

36. The satellite system of claim 34, wherein said means for providing comprises the GPS/NAVSTAR system and said means for receiving comprises a GPS/NAVSTAR receiver.

37. The satellite system of claim 34, wherein said control means further comprises an attitude controller for changing the attitude of said satellite whereby said force can be directed to correct formationkeeping errors.

38. The satellite system of claim 34, wherein said controller comprises a processor which employs an algorithm to calculate corrective maneuvers.

39. The satellite system of claim 34, wherein said control means comprises a controller to project future satellite position.

* * * * *